(12) United States Patent
Nesvadba et al.

(10) Patent No.: US 7,243,111 B2
(45) Date of Patent: Jul. 10, 2007

(54) CONTENT ANALYSIS APPARATUS

(75) Inventors: Jan Alexis Daniel Nesvadba, Eindhoven (NL); Freddy Snijder, Eindhoven (NL); Mauro Barbieri, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 361 days.

(21) Appl. No.: 10/477,493

(22) PCT Filed: May 8, 2002

(86) PCT No.: PCT/IB02/01621

§ 371 (c)(1),
(2), (4) Date: Nov. 12, 2003

(87) PCT Pub. No.: WO02/093928

PCT Pub. Date: Nov. 21, 2002

(65) Prior Publication Data

US 2004/0168205 A1   Aug. 26, 2004

(30) Foreign Application Priority Data

May 15, 2001   (EP)   .................................. 01201780

(51) Int. Cl.
*G06F 17/00* (2006.01)
*G06F 7/00* (2006.01)
(52) U.S. Cl. .................................... 707/104.1; 707/102
(58) Field of Classification Search ................ 707/112, 707/103, 100, 102, 103 R, 104.1; 700/83; 715/500, 526, 512; 380/305; 382/190, 305

See application file for complete search history.

(56) References Cited

U.S. PATENT DOCUMENTS

| 5,614,940 | A | | 3/1997 | Cobbley et al. | ................ 348/7 |
|---|---|---|---|---|---|
| 5,751,968 | A | * | 5/1998 | Cohen | ........................ 709/231 |
| 5,768,426 | A | * | 6/1998 | Rhoads | ........................ 382/232 |
| 6,021,231 | A | * | 2/2000 | Miyatake et al. | ........... 382/305 |
| 6,070,167 | A | | 5/2000 | Qian et al. | ................... 707/102 |
| 6,229,524 | B1 | * | 5/2001 | Chernock et al. | ........... 345/157 |
| 6,567,550 | B2 | * | 5/2003 | Miyatake et al. | ........... 382/190 |
| 6,567,980 | B1 | * | 5/2003 | Jain et al. | ...................... 725/61 |
| 6,651,253 | B2 | * | 11/2003 | Dudkiewicz et al. | ........ 725/114 |
| 2003/0033606 | A1 | * | 2/2003 | Puente et al. | ................ 725/110 |

FOREIGN PATENT DOCUMENTS

| WO | 9710564 | 3/1997 |
|---|---|---|
| WO | 0008849 | 2/2000 |

OTHER PUBLICATIONS

Jim Clark, A Telecomputer, Jul. 2, 1992, Silicon Graphic, Inc., Computer Graphics 26, pp. 19-23.*
Dimitrova et al., Real time commercial detection using MPEG features, Oct. 17, 2001, pp. 1-6.*

* cited by examiner

*Primary Examiner*—Jeffrey Gaffin
*Assistant Examiner*—Jacques Veillard

(57) ABSTRACT

An apparatus for content indexing uses processing parameters that become available while processing multimedia content. One embodiment of this processing includes compression. A video processor receives multimedia content and generates processed multimedia content. A system for content analysis receives processing parameters from the video processor, where the processing parameters are separate from the processed multimedia content and are generated as a result of processing the multimedia content. The system for content analysis generates content descriptors representative for the multimedia content, responsively to the processing parameters generated during or while processing, e.g., encoding or decoding, the multimedia content.

10 Claims, 1 Drawing Sheet

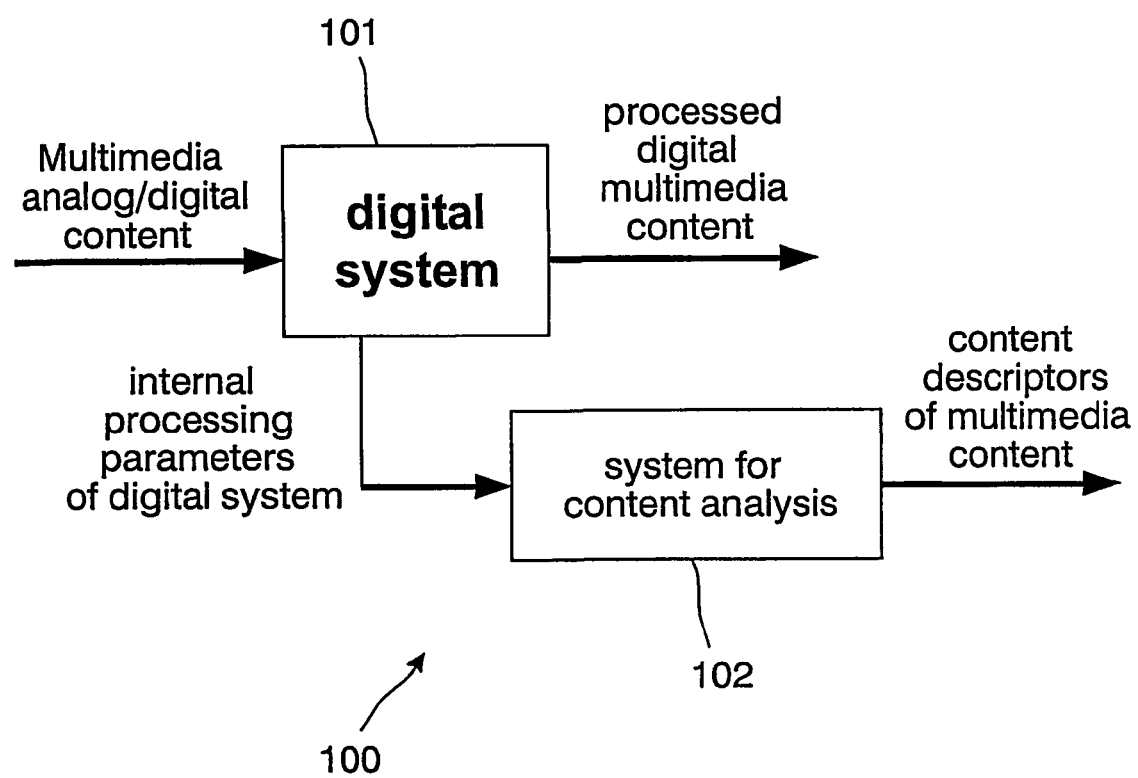

CONTENT ANALYSIS APPARATUS

The invention relates to a content analysis apparatus.

Users stored their analog audio/video (A/V) content in the past on tapes or other analog storage devices. They had to take care to indicate the content in such a way that the content of desire could be retrieved. Today the consumer stores multimedia material preferably in digital format due to better quality and lower storage capacity needed. The sharp price decrease of storage media enabled users to store more and faster content in contrary to the past. In the near future they will be overwhelmed by the amount of data stored on storage media. Because of the enormous amount of information, they will not be able to index the multimedia content stored manually for later retrieval. Tools to support the users are required.

The disadvantage of these algorithms is that they are very expensive in terms of processing power and therefore not feasible for consumer storage devices.

It is an object of the invention to provide a content analysis apparatus that increases the feasibility of analyzing multimedia content.

This object is reached by providing a content analysis apparatus, comprising a video processor capable of receiving multimedia content and generating processed multimedia content, and a system for content analysis, connected to the video processor to receive processing parameters from the video processor, said processing parameters being separate from said processed multimedia content; said processing parameters being generated as a result of processing the multimedia content and said system for content analysis being conceived to generate content descriptors representative for the multimedia content, responsively to said processing parameters.

The transmission of digital multimedia data created the opportunity to compress data by eliminating redundant information. Some of these compression standards for multimedia are MPEG-1, MPEG-2, MPEG-4, MPEG-21, DivX, AC3, MP3 and others. The information for the appropriate compression and processing of the multimedia content contains already some information about the content itself. It has been proven that the use of these internal parameters as input for content analysis system makes the real-time generation of content descriptors feasible. Further is the resulting compressed form of the multimedia content is much more efficient in terms of the number of bytes than the source data and therefore easier and faster to process.

The invention will now be described by means of a drawing, in which:

FIG. 1 shows an embodiment of the apparatus according to the invention.

Many digital systems, which process or compress the multimedia content, are already commercially available and are widely implemented. The internal parameters of these digital systems are until now only used for proper processing or compression. But it has been proven that the use of these internal parameters as input for content analysis system makes the real-time generation of content descriptors feasible. This goes for automatic generation of index points as well.

The content analysis is cheap in terms of processing power, due to the fact that most of the preprocessing is already done by the hardware of the digital system. This leads also to the fact that these algorithms can run in real-time on consumer device platforms and require no (or only marginal) additional hardware, which is a big advantage.

Due to the digital nature of stored content, digital signal processing algorithms can be used to automatically index the content and enable personalized searching and browsing tools. Also, the indexing generated and the content characteristics generated in this way, can be used for presentation features by the receiver while presenting the content to a user.

In an embodiment of the invention, the commercially available SAA6750H MPEG2 encoder (commercially available from Philips Semiconductors) can be programmed to create meta data related to the content. The meta data may contain information like whether the image format of the audiovisual data stream is in 4:3 or letterbox format, whether subtitles are present or information on for example the luminance or luminance variation. Also changes in the audio signal can be detected. In this way, also changes in the audiovisual information can be detected. These changes can be scene changes in a film, but they can also be changes from a film to a commercial message and vice versa.

Using the I2C bus of the SAA6750H, the meta data created can be send to other devices.

FIG. 1 shows an apparatus 100 as an embodiment of the apparatus according to the invention, comprising a digital system 101 and a system for content analysis 102. As mentioned, in an embodiment of the invention, the digital system 101 is the SAA6750H MPEG2 encoder.

The changes of scenes can be used to index the audiovisual stream and/or to create bookmarks that can be used for navigation through the audiovisual stream. Often, the compression or any other kind of other processing like encoding will take place with the broadcaster of the audiovisual information. This is in case of a broadcasted signal containing the stream of audiovisual information. There are, however, also other scenarios possible where the encoding and/or encryption of the audiovisual information will not take place at the location where the indexing of the audiovisual information is desired.

In that case, the provider of the information can provide the meta data that is created with the encryption of the data with the audiovisual information. It is known that in DVB (Digital Video Broadcasting), the broadcaster can accompany the MPEG data stream with a private data stream. The meta data, generated during encoding of the audiovisual information, can be send with the audiovisual information in the private stream. Of course, also other scenarios are possible, as is obvious for the person skilled in the art.

At the receiving end of the broadcasted signal, the meta data generated at the sending end while encoding the audiovisual data, can be used for navigation and/or indexing. Of course, it can be used for other purposes as well.

When the information provider provides the audiovisual information on a recording medium, the meta data can be put on the recording medium as well. This can be together with the stream of audiovisual information, but also in a separate table, that is stored on the medium as well.

Real-time content analysis, possibly combined with generation of bookmarks, anchors or any other kind of index indicators and the availability of this information by providing it with a steam of audiovisual information is of essential importance for applications related to multimedia.

Therefore, the invention may be embodied in all kinds of multimedia devices with high storage capacity. In various storage devices compression or processing of multimedia content is already part of the system. In that case, the meta data can also be generated within the receiver that receives the audiovisual information. Some examples are Personal Video Recorders (PVR), Personal Digital Recorders (PDR), Set-top boxes (STB), DVD-Video Recorders (DVD-VR), hard-disk device (HDD)-recorders, HiFi systems (MP3 conversion, internet radio), security/monitoring systems and many other fixed or mobile devices. All these systems are possible targets for the implementation of content analysis based on the above-mentioned idea This means, of course, that the invention does not have to be implemented with audio and video. It can be applied with video information only or audio information only as well.

The invention can be summarised as follows:

The sharp price decrease of storage media enabled users to store more and faster content in contrary to the past. In the near future they will be overwhelmed by the amount of data stored on storage media. Because of the enormous amount of information, they will not be able to index the multimedia content stored manually for later retrieval. Tools to support the users are required. The disadvantage of these algorithms is that they are very expensive in terms of processing power and therefore not feasible for consumer storage devices. The invention proposes an apparatus for content indexing using processing parameters that come available while processing multimedia content. One embodiment of this processing is compression, processing which is performed with almost all multimedia content before it is stored.

The invention claimed is:

1. A content analysis apparatus, comprising:
   a video processor capable receiving multimedia and at least one of coding and decoding the multimedia content using processing parameters to generate processed multimedia content;
   a system for content analysis, connected to the video processor receive said processing parameters from the video processor, said processing parameters being separate from said processed multimedia content;
   said processing parameters being generated as a result of the at least one of coding and decoding the multimedia content; and
   said system for content analysis being conceived to generate content descriptors representative for the multimedia content, responsively to said processing parameters used in the at least one of the coding and the encoding of the multimedia, wherein said processing parameters include at least one of an image format, luminance and luminance variation of the processed multimedia content.

2. The content analysis apparatus according to claim 1, wherein the system for content analysis is conceived to detect scene changes in the multimedia content.

3. The content analysis apparatus according to claim 2, wherein the apparatus further comprises means to generate index pointers for the multimedia content.

4. The content analysis apparatus according to claim 2, wherein the apparatus further comprises means to create bookmarks that can be used for navigation through the multimedia content.

5. The content analysis apparatus according to claim 1, wherein the video processor is a video compressor.

6. The content analysis apparatus according to claim 1, wherein the video processor is an encryption device.

7. A storage device for storing multimedia content, comprising the content analysis apparatus according to claim 1.

8. A broadcasting system comprising a video processor capable of receiving multimedia content and generating processed multimedia content, the broadcasting system being further arranged to:
   process the received multimedia content by at least one of coding and decoding the received multimedia content using processing parameters to generate processed multimedia content;
   broadcast the processed multimedia content;
   accompany the broadcasted multimedia with a stream comprising said processing parameters from the video processor, said processing parameters being separate from said processed multimedia content;
   said processing parameters being generated as result of the at least one of the coding and the decoding of the received multimedia content, wherein said processing parameters include at least one of an image format, luminance and luminance variation of the processed multimedia content.

9. The broadcasting system according to claim 8, wherein the broadcasting system is configured to receive broadcast multimedia content according to the DVB standard.

10. A multimedia device for receiving the multimedia content and processing parameters broadcasted by the broadcasting system according to claim 8, the multimedia device being arranged to generate index pointers for the multimedia content, responsive to the processing parameters.

* * * * *